United States Patent [19]

Mitomo

[11] Patent Number: 4,677,525
[45] Date of Patent: Jun. 30, 1987

[54] GAS-INSULATED SWITCHGEAR
[75] Inventor: Toshihide Mitomo, Hitachi, Japan
[73] Assignee: Hitachi, Ltd., Tokyo, Japan
[21] Appl. No.: 876,793
[22] Filed: Jun. 20, 1986
[30] Foreign Application Priority Data
 Jul. 8, 1985 [JP]  Japan .................................. 60-148171
[51] Int. Cl.[4] .............................................. H02B 1/04
[52] U.S. Cl. .................................... 361/341; 361/335;
 200/48 R
[58] Field of Search ............... 361/331, 333, 335, 341,
 361/376; 200/48 R, 50 AA; 339/22 B
[56] References Cited
U.S. PATENT DOCUMENTS
 4,493,009  1/1985  Lorenz ................................ 361/341

Primary Examiner—G. P. Tolin
Attorney, Agent, or Firm—Antonelli, Terry & Wands

[57] ABSTRACT

Disclosed is a gas-insulated switchgear in which three circuit breakers are arranged in tandem between a pair of main bus bars spaced apart by a predetermined distance. The connection between the three circuit breakers is such that adjacent circuit breakers are connected by a connecting bus bar to their lead-out parts remoter from each other, and disconnecting switches, etc. are disposed on the connecting bus bars. This arrangement shortens the distance between the adjacent circuit breakers, so that the gas-insulated switchgear can be shortened in the length in the tandem direction of the circuit breakers.

8 Claims, 3 Drawing Figures

GAS-INSULATED SWITCHGEAR

BACKGROUND OF THE INVENTION

This invention relates to a gas-insulated switchgear, and more particularly to a shortened gas-insulated switchgear of 1½(one-and-half) circuit breaker system.

A prior art, three-phase common tank type gas-insulated switchgear of 1½ (one-and-half) circuit breaker system is disclosed in, for example, Japanese Utility Model Unexamined Publication No. 139307/81. In the disclosed gas-insulated switchgear, three circuit breakers are connected between a pair of main bus bars in such a relation that adjacent circuit breakers are connected to a connecting bus bar at their nearest lead-out parts, and disconnecting switches and earthing switches are provided on this connecting bus bar. This 1½=(3/2) circuit breaker system refers to a breaker system in which three circuit breakers are connected between two main bus bars.

FIG. 1 is a partly cut-away, schematic front elevation view of such a prior art, gas-insulated switchgear of 1½ circuit breaker system.

Referring to FIG. 1, a pair of main bus bars 1 and 2 are disposed in a relation spaced apart by a predetermined distance, and one set of three circuit breakers 3, 4 and 5 are disposed in tandem to be connected between the two main bus bars 1 and 2. Each of the circuit breakers 3, 4 and 5 is formed with a pair of lead-out parts at its axial ends respectively, and these lead-out parts are connected to connect the three circuit breakers 3, 4 and 5 in series between the main bus bars 1 and 2. The circuit breaker 3 is connected to its lead-out part 3a, nearer to the main bus bar 1 than the lead-out part 3b, to the main bus bar 1 by a connecting bus bar 6. Also, the circuit breaker 5 is connected to its lead-out part 5b, nearer to the main bus bar 2 than the lead-out part 5a, to the main bus bar 2 by a connecting bus bar 7.

The connection between the three circuit breakers 3, 4 and 5 is such that adjacent circuit breakers are connected to their lead-out parts nearer to each other. That is, the circuit breakers 3 and 4 are connected to their nearer lead-out parts 3b and 4a by a connecting bus bar 8, and the circuit breakers 4 and 5 are connected to their nearer lead-out parts 4b and 5a by a connecting bus bar 9. Further, external lead-out means 10 and 11 such as bushings, gas bus bars or cable heads for connection to an external equipment are connected to substantially middle portions of the connecting bus bars 8 and 9 repectively.

However, due to the necessity for provision of disconnecting switches and earthing switches on the connecting bus bars 8 and 9, these connecting bus bars 8 and 9 require a large axial length, and, as a result, the distance d between the circuit breakers 3, 4 and 5 increases inevitably as seen in FIG. 1. Therefore, the prior art gas-insulated switchgear has been defective in that the overall size of the switchgear becomes large and bulky inevitably.

SUMMARY OF THE INVENTION

It is an object of the present invention to provide a gas-insulated switchgear having a shortened length in a direction in which three circuit breakers are arranged in tandem.

Another object of the present invention is to reduce the size of a building in which the gas-insulated switchgear is installed.

The present invention which attains the above objects is characterized in that, in a gas-insulated switchgear including three circuit breakers disposed in tandem between a pair of main bus bars, adjacent circuit breakers are connected to their remoter lead-out parts by a connecting bus bar, and switches including disconnecting switches are provided on the connecting bus bar.

DESCRIPTION OF THE PREFERRED EMBODIMENT

A preferred embodiment of the gas-insulated switchgear according to the present invention will be described with reference to the drawings.

Figure 2:
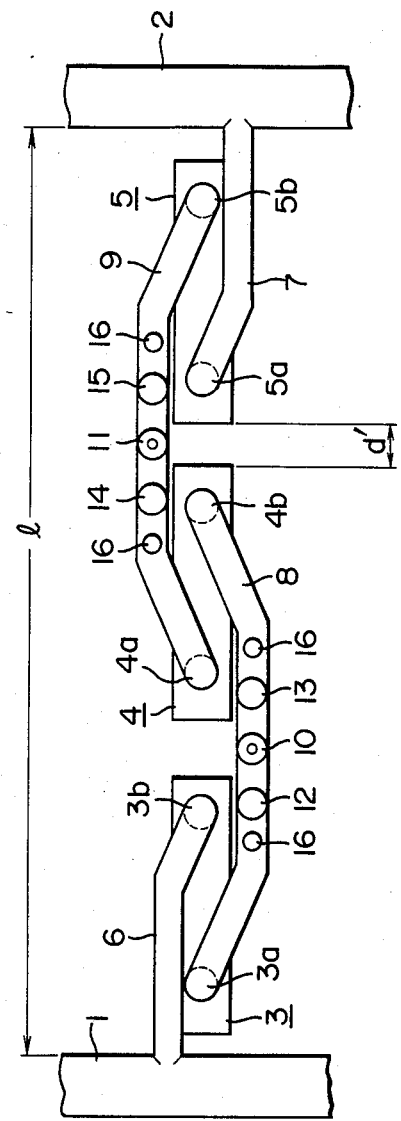
FIG. 2 is a schematic plan view showing the structure of an embodiment of the gas-insulated switchgear according to the present invention.
Figure 3:
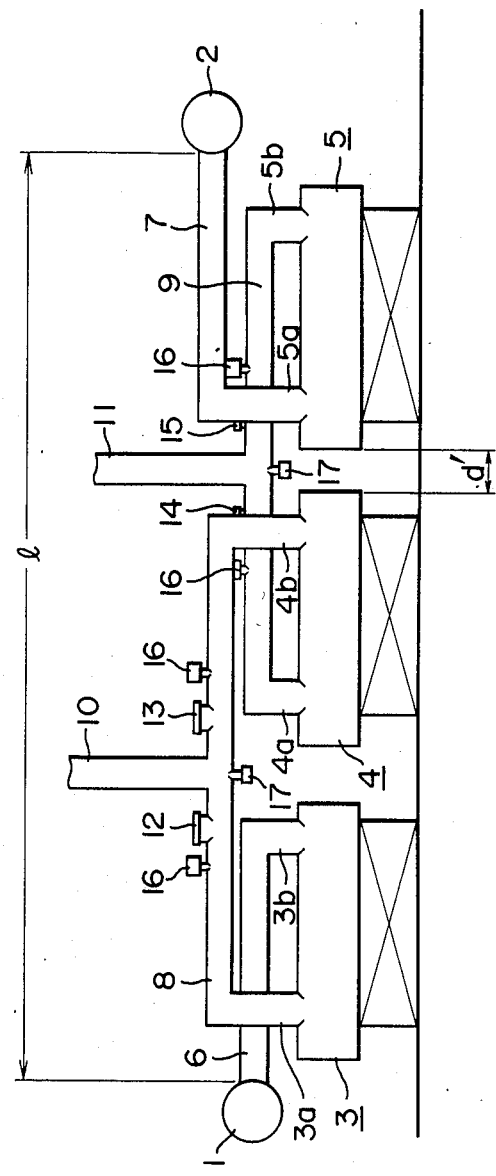
FIG. 3 is a schematic front elevation view of the switchgear shown in FIG. 2.

FIG. 2 is a schematic plan view showing the structure of one of the phases of the gas-insulated switchgear, and FIG. 3 is a schematic front elevation view of the switchgear shown in FIG. 2.

Figure 1:
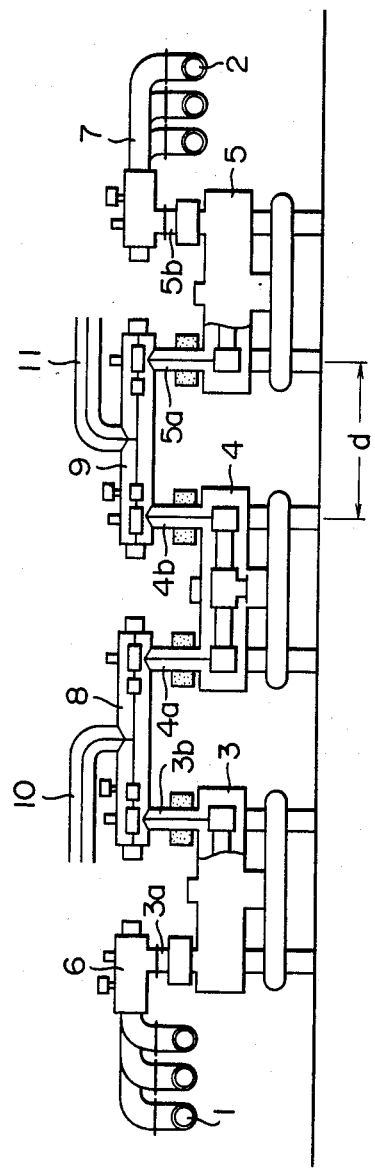
FIG. 1 is a partly cut-away, schematic front elevation view showing the structure of a prior art gas-insulated switchgear.

Referring to FIGS. 2 and 3 in which like reference numerals are used to designate like parts appearing in FIG. 1, a pair of main bus bars 1 and 2 are disposed in a relation spaced apart by a predetermined distance 1 from each other, and one set of circuit breaking means including three circuit breakers 3, 4 and 5 are arranged in tandem to be connected between the main bus bars 1 and 2. Each of the circuit breakers 3, 4 and 5 is formed with a pair of lead-out parts at its axial ends respectively, and these lead-out parts are connected to connect the three circuit breakers 3, 4 and 5 in series between the main bus bars 1 and 2. The circuit breaker 3 is connected to its lead-out part 3b, remoter from the main bus bar 1 than the lead-out part 3a, to the main bus bar 1 by a first connecting bus bar 6 which is first connecting means. Also, the circuit breaker 5 is connected to its lead-out part 5a, remoter from the main bus bar 2 than the lead-out part 5b, to the main bus bar 2 by a first connecting bus bar 7 which is similarly first connecting means. As shown in FIG. 2, these two connecting bus bars 6 and 7 extend clear of the other lead-out parts 3a and 5b and without contact with each other. Also, as shown in FIG. 3, the connecting bus bars 6 and 7 rise in the vertical direction from the respective lead-out parts 3b and 5a and then extend substantially in the horizontal direction.

The connection between the three circuit breakers 3, 4 and 5 is such that adjacent circuit breakers are connected to their lead-out parts remoter from each other. That is, the circuit breakers 3 and 4 are connected to their remoter lead-out parts 3a and 4b by a second connecting bus bar 8 which is second connecting means. Similarly, the circuit breakers 4 and 5 are connected to their remoter lead-out parts 4a and 5b by a second connecting bus bar 9 which is similarly second connecting means. The connecting bus bars 8 and 9 extend clear of the lead-out parts 3b, 4a and 4b, 5a to which they are not connected respectively, and these connecting bus bars 8 and 9 have a shortest possible axial length. The connecting bus bars 6, 7, 8 and 9 are in the form of generally linear pipes. External lead-out means 10 and 11 such as bushings, gas bus bars or cable heads for connection to an external equipment are connected to substantially middle portions of the connecting bus bars 8 and 9 respectively. The gas bus bars are internally filled with an inert gas or the like. In the present invention, the whole gas-insulated switchgear is installed in a room of a building and is connected to an equipment installed in a room of an upper floor by the external lead-out means 10 and 11 which are in the form of gas bus bars.

As shown in FIG. 3, the connecting bus bars 8 and 9 rise in the vertical direction from the lead-out parts of the associated circuit breakers and then extend substantially in the horizontal direction. In FIG. 3, the horizontal portions of the connecting bus bars 6, 7, 8 and 9 are shown located at different levels for convenience of illustration. However, the horizontal portions of these connecting bus bars may have the same level. The connecting bus bars 8 and 9 are provided with two disconnecting switches 12, 13 and 14, 15, respectively. More precisely, the disconnecting switch 12 is provided on the connecting bus bar 8 between the lead-out part 3a of the circuit breaker 3 and the external lead-out means 10, and the disconnecting switch 13 is provided on the connecting bus bar 8 between the lead-out part 4b of the circuit breaker 4 and the external lead-out means 10. Similarly, the disconnecting switch 14 is provided on the connecting bus bar 9 between the lead-out part 4a of the circuit breaker 4 and the external lead-out means 11, and the disconnecting switch 15 is provided on the connecting bus bar 9 between the lead-out part 5b of the circuit breaker 5 and the external lead-out means 11. First earthing switches 16 are provided on the connecting bus bars 8 and 9 between the individual circuit breakers and the associated disconnecting switches respectively, and second earthing switches 17 are also provided on the connecting bus bars 8 and 9 respectively for earthing the conductor of the external lead-out means 10 and 11 as required. Disconnecting switches (not shown) and earthing switches (not shown) disposed between the circuit breakers and the associated disconnecting switches, are also provided on the connecting bus bars 6 and 7.

It will be seen from the above descriptions that, because of the necessity for provision of the disconnecting switches and earthing switches and also for provision of branches for connection to the external lead-out means, the connecting bus bars 8 and 9 require a relatively large axial length. According to the present invention which satisfies the above requirement, the circuit breakers 3 and 4 adjacent to each other are connected to their remoter lead-out parts 3a and 4b by the connecting bus bar 8, and the circuit breakers 4 and 5 adjacent to each other are connected to their remoter lead-out parts 4a and 5b by the connecting bus bar 9. Thus, when the distance between the circuit breakers is fixed, the axial length of the connecting bus bars 8 and 9 can be made larger than that in the prior art arrangement in which the circuit breakers 3, 4 and 4, 5 are connected to their nearer leadout parts 3b, 4a and 4b, 5a, respectively. Therefore, when the required axial length of the connecting bus bars 8 and 9 is fixed, the circuit breakers 3, 4 and 5 can be disposed in a relation spaced apart by a shorter distance d' as shown in FIGS. 2 and 3, so that the distance l between the main bus bars 1 and 2 can be correspondingly shortened. This is advantageous especially when the gas-insulated switchgear is installed in a building, because the size of the building can be made small.

The shape of the connecting bus bars 8 and 9 is in no way limited to that employed in the illustrated embodiment. Although the above description has referred to a gas-insulated switchgear section of a single phase, it is apparent that three sets of such switchgear sections are connected in parallel in the case of three phases.

It will be understood from the foregoing description that, in the gas-insulated switchgear of the present invention, adjacent circuit breakers are connected to their remoter lead-out parts by a connecting bus bar. Therefore, connecting bus bars having a structurally-required large axial length can be provided even when the circuit breakers are relatively closely spaced apart from each other, and the gas-insulated switchgear has a shortened length in the tandem direction of the circuit breakers.

I claim:

1. A gas-insulated switchgear comprising:
 a pair of main bus bars disposed in parallel and spaced apart by a predetermined distance from each other;
 circuit breaking means including a first circuit breaker, a second circuit breaker and a third circuit breaker arranged in tandem in the above order between said main bus bars, each of said circuit breakers having leadout parts at axial ends thereof respectively;
 first connecting means connecting said first and third circuit breakers to said main bus bars respectively in such a relation that said first and third circuit breakers are connected to said main bus bars at one of the lead-out parts located remoter from said main bus bars than the other;
 second connecting means connecting said second circuit breaker to said first and third circuit breakers respectively in such a relation that said second circuit breaker is connected to the lead-out parts located remoter from said first and third circuit breakers to the other lead-out parts of said first and third circuit breakers respectively;
 external lead-out means connected to substantially middle portions of said second connecting means respectively; and
 disconnecting switches provided on said second connecting means between said external lead-out means and said lead-out parts to which said second connecting means are connected, respectively.

2. A gas-insulated switchgear as claimed in claim 1, wherein said first connecting means and said second connecting means are in the form of generally linear pipes.

3. A gas-insulated switchgear as claimed in claim 1, wherein said first connecting means and said second connecting means are disposed so as not to make contact with each other.

4. A gas-insulated switchgear as claimed in claim 1, wherein said first connecting means are of the same shape, and said second connecting means are also of the same shape.

5. A gas-insulated switchgear as claimed in claim 1, wherein said first connecting means are connected at one end thereof to said main bus bar pair in an orthogonal relation and to the other end thereof to said lead-out parts of said first and third circuit breakers respectively.

6. A gas-insulated switchgear as claimed in claim 1, wherein said first connecting means and said second connecting means are disposed in parallel to the common axis of said circuit breakers respectively.

7. A gas-insulated switchgear as claimed in claim 1, wherein first earthing switches are disposed on said second connecting means between said disconnecting switches and said lead-out parts of said circuit breakers.

8. A gas-insulated switchgear as claimed in claim 1, wherein second earthing switches are disposed on said second connecting means for earthing the conductor of said external lead-out means.

* * * * *